(No Model.)
C. W. MILLER.
LABEL HOLDER.
No. 479,716. Patented July 26, 1892.
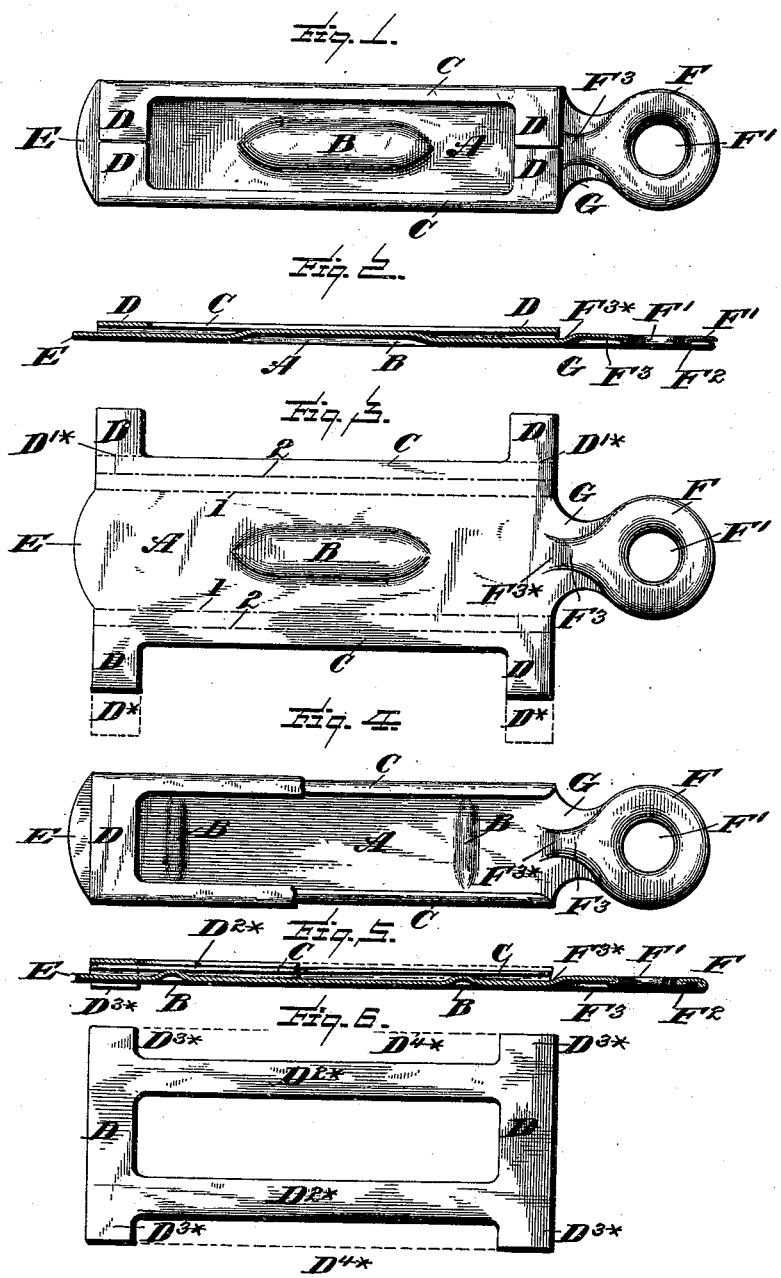
Witnesses:
L. C. Hills
W. S. Duvall
Inventor
Charles W. Miller.
by E. B. Stocking
Attorney

UNITED STATES PATENT OFFICE.

CHARLES W. MILLER, OF CLIFTON, ARIZONA TERRITORY, ASSIGNOR OF ONE-HALF TO CHARLES ROYCE, OF SAME PLACE.

LABEL-HOLDER.

SPECIFICATION forming part of Letters Patent No. 479,716, dated July 26, 1892.

Application filed February 20, 1889. Serial No. 300,540. (No model.)

*To all whom it may concern:*

Be it known that I, CHARLES W. MILLER, a citizen of the United States, residing at Clifton, in the county of Graham, Territory of Arizona, have invented certain new and useful Improvements in Label-Holders, of which the following is a specification, reference being had therein to the accompanying drawings.

This invention has relation to tag or label holders; and among the objects in view is to provide a holder which is cheap, strong, and serviceable, capable of safely retaining a label, and promoting its ready insertion and removal without the employment of a complicated construction.

A further object is to construct the holder of a single piece of material and to provide it with an eye for its attachment by a cord to various packages, more especially mail pouches or bags.

Other objects and advantages of the invention will appear in the following description and the novel features thereof will be particularly pointed out in the claims.

Referring to the drawings, Figure 1 is a plan of a tag or label holder constructed in accordance with my invention. Fig. 2 is a central longitudinal section. Fig. 3 is a plan of the blank from which the holder is made. Fig. 4 is a modification involving the holder, formed of two pieces. Fig. 5 is a central longitudinal section of Fig. 4, and Fig. 6 is a plan of the blank from which the additional piece is made.

Like letters refer to like parts in all the figures.

The holder comprises in its make-up a back A, having a holding-rib B, formed by upsetting the metal from the rear of the back. Flanges C extend along each side of the holder, and near each end are cross-bars D. The back extends, as at E, at one end beyond the cross-bars to form a guiding flange or lip, while at the opposite end it is extended to form a head F. This head is apertured to form an eye F' for the passage therethrough of a cord, which serves to connect the label-holder to any bag, pouch, or package. The head is upset in circular form, as clearly shown, to form a rounded surface, against which the cord comes in contact, so that it shall not be unduly worn by the holder. The edge of the material at the boundary of the eye F' is turned or folded, as at $F^2$, to aid in preventing the wearing of the cord. A rib $F^3$ extends from the head to the back A and centrally along the neck G for the purpose of strengthening said neck and stiffening the holder at this point. This rib merges into the back, as at $F^{3\times}$, so as not to interfere with the introduction and retention of a label within the holder and so as to serve, in a measure, as a stop to prevent longitudinal movement of the label in the holder toward the head. To form such a holder, sheet metal or any other desired material is first cut to the form shown in Fig. 3, then bent upon the lines 1 1 and subsequently or simultaneously, as desired, on the lines 2 2, thus forming the flanges C over and parallel with the back A and bringing the parts D in line with each other, preferably abutting against each other to add stiffness to the holder when completed.

While experience has shown that it is unnecessary to weld or solder or otherwise secure the ends of the bars D to each other permanently, still this may be done to give additional strength, if desired.

A further modification of the invention may consist in forming the cross-bars D by extending them at one side of the blank, as shown at $D^\times$, and removing them from the opposite side of the blank, as shown by dotted lines $D'^\times$. The additional function performed by the cross-bars D is that of retaining the ends of the label within the holder. The side edges of the label are retained in position by the side flanges C. As thus far described, it will be seen that by guiding the end of the label between the back and the end bar D by means of the projecting lip E said label may be forced longitudinally within the holder, and in entering it will ride upon, over, and beyond the projection B, and finally rest with its ends under the opposite cross-bar D, and it may be against the end $F^{3\times}$ of the neck-rib $F^3$. The projection B serves to hold the label within the holder by the friction of the label on the parts of the holder with which it comes in contact. The projection also in the form shown in Fig. 1 serves as a point for resisting the pressure of the thumb or finger in the act of removing a label from the holder, and thus assists materially in such removal.

In Fig. 4 I have illustrated the back A, formed with a projection B near each end and arranged transversely, instead of a single projection arranged longitudinally. I have further illustrated a form of back which is not provided with the cross-bars D, these being provided on a separate piece. (Shown in plan in Fig. 6.) In this form the blank comprises two narrow strips $D^{2x}$, extending from one cross-bar to the other, and the latter are extended laterally, as at $D^{3x}$, and form lips, or, as indicated by the dotted lines $D^{4x}$, the strips $D^{2x}$ may be extended to form continuous lips which are adapted to embrace the edges of the body, as clearly shown in Fig. 5. The side strips are bent to embrace the flanges C. The main advantage of forming the holder of two pieces is that by doubling the thicknesses of material along its edges the holder is materially stiffened and the cross-bars are without a joint.

The manner of inserting and withdrawing a label from this form is the same as that described with reference to Fig. 1, the absence of the longitudinal projection B resulting in a less convenient manner of inserting or removing a label, in as the same will have to be more directly guided in its movements than when the projection is arranged as shown in Fig. 1.

By the construction above described I produce a label-holder which is adapted especially for use in connection with mail-bags where they are subjected to severe tests and are often seized as a handle with which to move or carry the bag itself, together with its contents. This necessitates not only strength in the holder itself, but some means of preventing the cutting or undue wearing of the cord by means of which the holder is connected with the bag. The projections serve to stiffen the holder and aid in rendering the holder capable of withstanding being driven over by a heavily-loaded mail-wagon, a test to which such devices are often submitted.

Having described my invention, what I claim is—

1. A tag or label holder having an eye the edges of which are thickened with upset metal of the head of the holder, substantially as specified.

2. A tag or label holder having a rounded eye and a neck-strengthening rib, both consisting of upset material of the holder, substantially as specified.

3. A tag or label holder having integral side flanges and cross-bars upon opposite sides of of the center, substantially as specified.

4. A tag or label holder having a cord-eye and side flanges and end cross-bars formed integrally, substantially as specified.

5. A tag or label holder having side flanges, a guiding-lip, and cross-bars near the ends and all formed integrally, substantially as specified.

6. A tag or label holder having a head perforated and struck up to form a rounded cord-eye, a projection struck up from its back, side flanges, cross-bars upon opposite sides of the center, and a guiding-lip, all formed of a single piece, substantially as specified.

7. A blank for forming a tag or label holder, consisting of a back A, cross-bars D, near the ends, neck G, and head F, substantially as specified.

8. A tag-holder having a head struck up and perforated, forming a rounded cord-eye, and a neck-strengthening rib extending therefrom and merged into the back to form a stop for the label, substantially as specified.

9. A label-holder formed of a single piece of metal with side flanges, a bulge, and means for retaining a label therein, as set forth.

In testimony whereof I affix my signature in presence of two witnesses.

CHARLES W. MILLER.

Witnesses:
HEATH SUTHERLAND,
C. S. CHAMPION.